(12) United States Patent
Kizaki

(10) Patent No.: US 6,647,334 B2
(45) Date of Patent: Nov. 11, 2003

(54) ARITHMETIC AND CONTROL UNIT

(75) Inventor: Katsutoshi Kizaki, Tokyo (JP)

(73) Assignee: Honda Elesys Co., Ltd., Tochigi (JP)

( * ) Notice: Subject to any disclaimer, the term of this patent is extended or adjusted under 35 U.S.C. 154(b) by 0 days.

(21) Appl. No.: 10/024,214

(22) Filed: Dec. 21, 2001

(65) Prior Publication Data

US 2002/0082763 A1 Jun. 27, 2002

(30) Foreign Application Priority Data

Dec. 26, 2000 (JP) ........................................ 2000-394807

(51) Int. Cl.[7] .............................. G06F 9/38; B60T 8/96
(52) U.S. Cl. ........................... 701/71; 701/29; 303/199
(58) Field of Search .................... 701/29, 71; 714/22, 714/24, 55, 734, 1, 6, 2, 3, 50, 724; 303/122.05, 199, 122.04, 122.07; 712/218, 200, 234; 702/185

(56) References Cited

U.S. PATENT DOCUMENTS

| | | | | |
|---|---|---|---|---|
| 5,524,078 A | * | 6/1996 | Kolb et al. | ............ 364/424.03 |
| 5,652,910 A | * | 7/1997 | Boutaud et al. | ............ 395/800 |
| 5,735,583 A | * | 4/1998 | Katayama et al. | ..... 303/122.05 |
| 5,924,776 A | * | 7/1999 | Kimura et al. | ......... 303/122.05 |
| 6,076,172 A | * | 6/2000 | Kimura et al. | ................ 714/24 |
| 6,498,403 B1 | * | 12/2002 | Hagidaira et al. | ........... 307/9.1 |

* cited by examiner

Primary Examiner—Tan Q. Nguyen
Assistant Examiner—Dalena Tran
(74) Attorney, Agent, or Firm—Sughrue Mion, PLLC

(57) ABSTRACT

An arithmetic and control unit includes a monitor unit which counts a cycle time by receiving diagnostic pulses and generates an overflow bit that takes on a prescribed state value when it decides that the cycle time is larger than a prescribed overflow decision time and outputs it after a lapse of a prescribed time, and outputs a pulse-form reset signal as an active level during a prescribed time when the overflow bit is a prescribed state value. Also included is a control unit which generates a diagnostic pulse at every execution of a unit control during control operation and is reactivated upon receipt of active level of a reset signal, and receives and stores the overflow bit at every activation including a reactivation.

7 Claims, 8 Drawing Sheets

ARITHMETIC AND CONTROL UNIT

BACKGROUND OF THE INVENTION

1. Field of the Invention

The present invention relates to an arithmetic and control unit, and more particularly to an arithmetic and control unit with enhanced reliability of fault detection in antilock brake control.

2. Description of the Prior Art

Antilock brake control which is adopted for securing safety during travel of a vehicle requires an extraordinarily high reliability since malfunctions of the control device is directly responsible to the human life. In the meantime, when a malfunction occurred due to an unforeseen factor such as noise, it is desirable to reset the control device to the normally controlled state as quickly as possible.

In FIG. 7 is shown a block diagram of a conventional arithmetic and control unit for antilock brake control established to satisfy such a requirement.

An arithmetic and control unit 70 has a control unit 71 which executes antilock brake control and a monitor unit 72 which monitors the operating conditions of the control unit 71.

The control unit 71 is provided with a main control means 73, a diagnostic pulse generating means 74 and a reset signal input means 75. The main control means 73 inputs a plurality of wheel speed sensor signals such as wheel speed, calculates the controlled value of the break fluid pressure based on a control program set in advance, and outputs a break control signal CTL. The diagnostic pulse generating means 74 outputs a diagnostic pulse DCP having a cycle T1 in a prescribed range by receiving a diagnostic pulse instruction signal IDP transmitted from the main control means 73 at every completion of a unit control operation. The reset signal input means 75 inputs a pulse-form reset signal RST1 to shape its waveform and outputs the result, an internal reset signal RST2, to the diagnostic pulse generating means 74 and the main control means 73.

The monitor unit 72 is provided with a clock means 76, a reset signal output means 77 and a warning generating means 78. The clock means 76 measures the cycle T1 of the diagnostic pulse DCP by counting the clock and diagnoses the operating conditions of the control unit 71. When the diagnostic pulse DCP is not received within a prescribed overflow decision time T2, the counted value of the clock means overflows, and a warning instruction signal IW and a reset instruction signal RST0 are sent to active level. When the warning instruction signal IW is received, the warning generating means 78 outputs an abnormality warning signal WRN to the outside. When the reset instruction signal RST0 is received, the reset signal output means 77 outputs a pulse-form reset signal RST1 to the control unit 71.

FIG. 8 shows operating timing charts of the control unit 71 and the monitor unit 72. FIG. 8A is an operating timing chart when abnormal operation occurred continuously after a normal operation. In the normal operation condition, since the control program is set so as to execute a diagnostic pulse issue instruction routine at every completion of execution of the unit control of the main control means, the diagnostic pulse DCP of cycle T1 is output from the diagnostic pulse generating means 74. An overflow decision time T2 (100 ms, for example) of the clock means 76 is set to be sufficiently large compared with the cycle T1 (10 ms, for example) of the diagnostic pulse DCP, so that the clock means 76 decides that execution of the control operation is normal when it detects an edge (for example, the trailing edge as in FIG. 8) of the diagnostic pulse DCP within the measurement allowable time T2.

In contrast, if the system runs away due to abnormality in the execution of the control program of the main control part caused by some factor, the diagnostic pulse generating means 74 will cease to generate the diagnostic pulse DCP because the operation detours the diagnostic pulse issue instruction routine of the control program. Since an edge of the diagnostic pulse DCP cannot be detected within the overflow decision time T2, the clock means 76 outputs the warning instruction signal IW at active level by deciding that the control unit 71 is in an abnormal state, and the warning generation means 78 outputs the abnormality warning signal WRN. At the same time, the clock means 76 causes the reset signal output means 77 to generate the pulse-form reset signal RST1, and reactivates the diagnostic pulse generating means 74 and the main control means 73 via the reset signal input means 75.

If the factor of runaway in the execution of the control program is due to transitory noise or the like from the outside, the system returns to the normal condition by reactivation of the main control means 73, so that the diagnostic pulse DCP is sent to the clock means 76 with the cycle of T1, thereafter it is decided that the system is in the normal conditions.

If the runaway factor of the control program is caused by continuous abnormality of the wheel speed sensor signal SW, failure of the main control means 73, failure of the diagnostic pulse generating means 74, or the like, the system does not return to the normal operation even by the reset signal RST1, and the abnormality warning signal WRN is output continuously as shown in operating timing chart FIG. 8A.

As in the above, in the conventional arithmetic and control unit 70 shown in FIG. 7, against a continuously generated abnormality, it is possible to take a countermeasure such as stopping the antilock brake control by continuous generation of the abnormality warning signal, and against a transitory abnormality by noise or the like, it is possible to let the system return to the normal state by resetting it once and activating it again let it resume the antilock brake control.

However, if the main control means 73 of the control unit 71 is in trouble, and the system runs away only when a specific processing routine in the control program is executed, the abnormal state occurs irregularly and intermittently or sporadically.

FIG. 8B is an operating timing chart for an example in which an abnormal state of the control unit occurs intermittently. Here, whenever the clock means 74 decides it as an abnormal state and reactivates the main control means 73 by generating the pulse-form reset signal RST1, the system returns to the normal state, but it repeats to go back to the abnormal state. In such a case, since the abnormality warning signal WRN is not generated continuously in spite of the failure of the control unit 71, antilock brake control is not stopped, and the vehicle travels in a potentially hazardous state which is embracing a failure.

Moreover, when the clock means 76, for example, of the monitor unit 72 is in failure, it becomes impossible to detect abnormality of the control unit, but the conventional arithmetic and control unit 70 is not in possession of a means to inspect whether or not the monitor unit operates normally.

BRIEF SUMMARY OF THE INVENTION

Object of the Invention

It is the object of the present invention to provide an arithmetic and control unit which is provided with both of the function of inspecting whether the monitor unit is normal or not, that is, whether the inspection of abnormality of the control unit is possible or not, and the function of deciding such a failure in which the control unit exhibits abnormal state with irregular intervals as a failure and generating a failure warning signal.

Summary of the Invention

The arithmetic and control unit according to the present invention has a monitor unit which counts the cycle time by receiving the diagnostic pulse, and generates an overflow bit that takes on a prescribed state value when it decides that the cycle time is larger than a prescribed overflow decision time and outputs it at a lapse of a prescribed time, and outputs a pulse-form reset signal as active level during a prescribed time when the overflow bit is the prescribed state value, as well as a control unit which generates a diagnostic pulse at every execution of a unit control during control operation, is reactivated when active level of the reset signal is received and inputs and stores the overflow bit after an activation including a reactivation, and when the stored overflow bit is not a prescribed state value, stops the output of the diagnostic pulse to the monitor unit during a monitor unit inspection time which is larger than the overflow decision time by deciding it to be an initial activation and generates a failure warning signal if the reset signal is not received within the monitor unit inspection time, and when the stored overflow bit is the prescribed state value, it is decided to be a reactivation, and also outputs a failure warning signal if the number of times of overflow updated by adding 1 to the number of times of overflow stored in a nonvolatile memory exceeds a prescribed allowable number of times.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Figure 1:
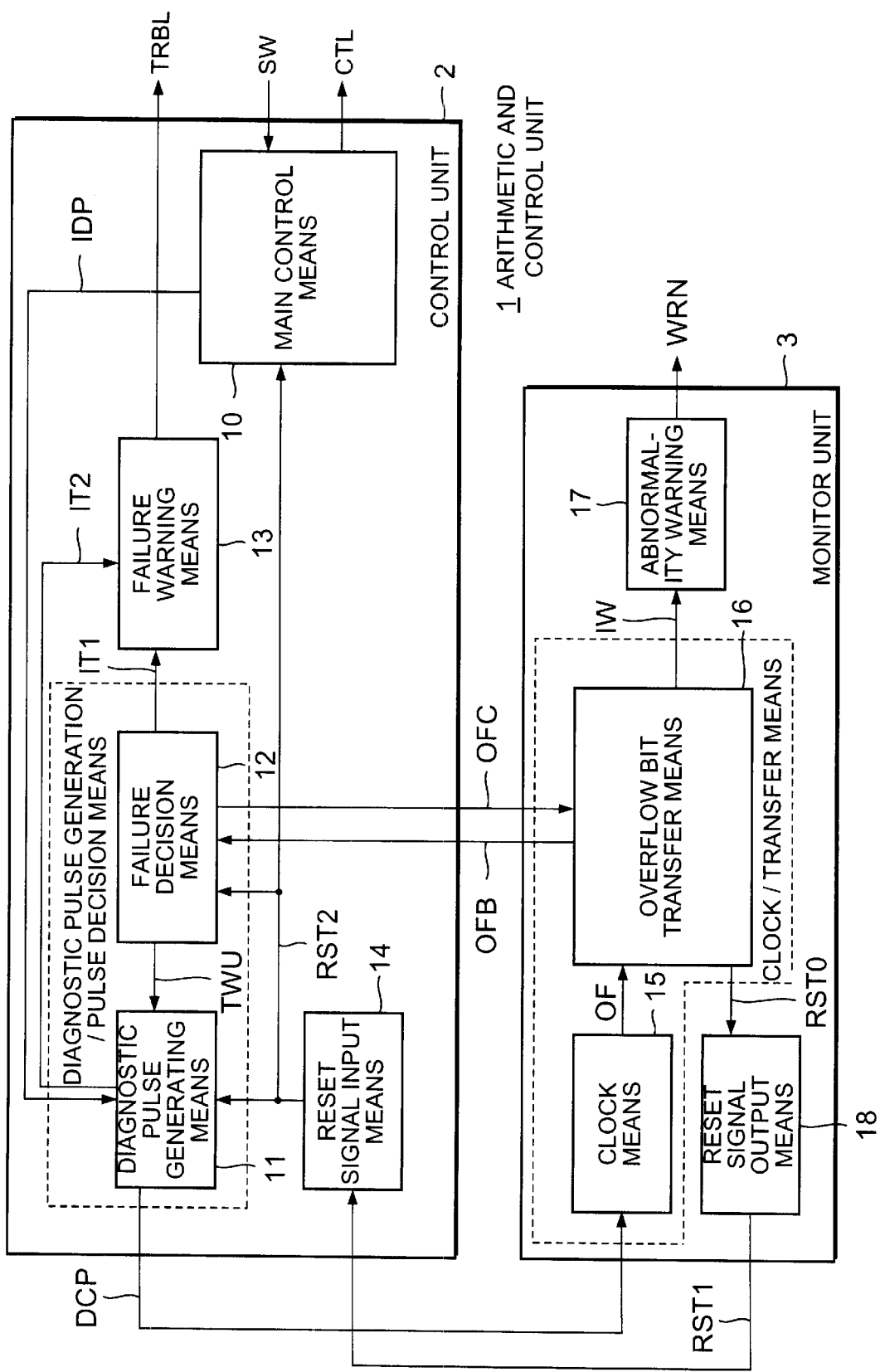
FIG. 1 is a block diagram of an embodiment of the arithmetic and control unit according to the present invention.

Referring to the drawings, the present invention will be described in detail in the following. FIG. 1 is a block diagram of an embodiment of the arithmetic and control unit according to this invention. The arithmetic and control unit consists of a control unit 2 and a monitor unit 3.

Figure 7:
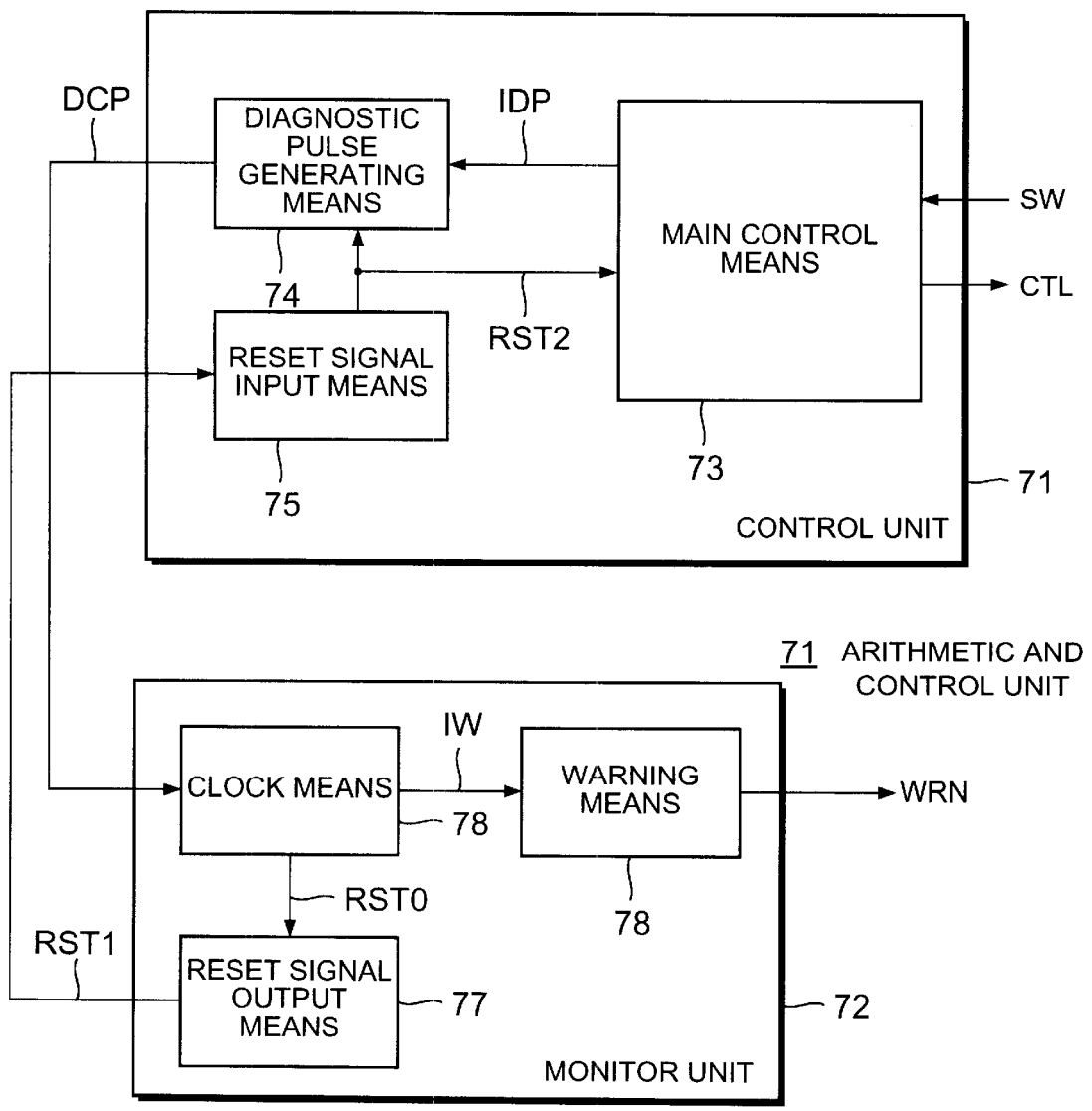
FIG. 7 is a block diagram of a conventional arithmetic and control unit.
Figure 8A:
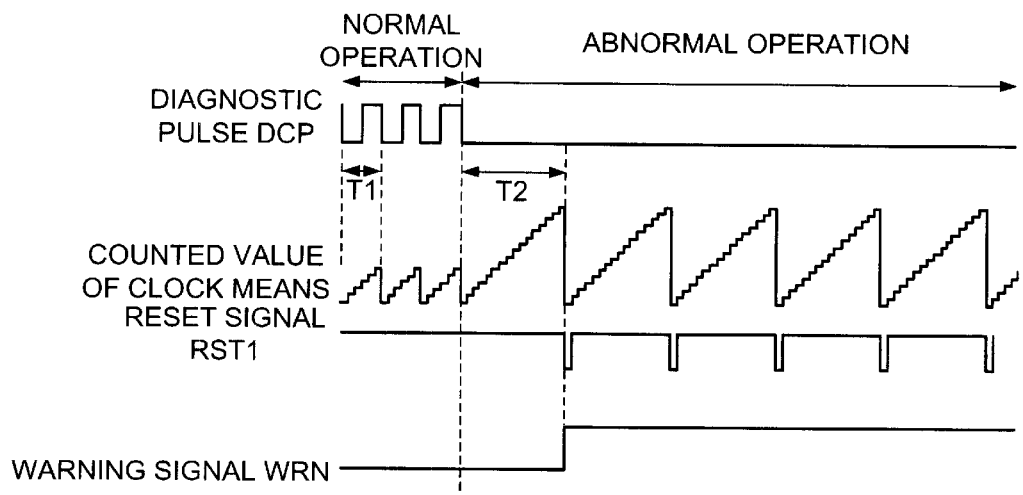
FIGS. 8A and 8B are respectively operating timing charts of the conventional arithmetic and control unit.
Figure 8B:
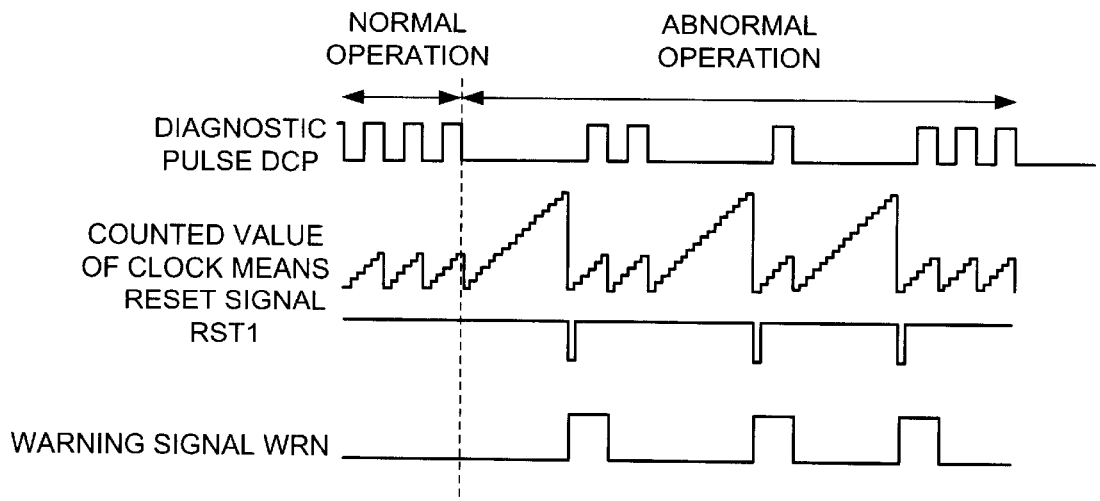

The control unit 2 is provided with a main control means 10, a diagnostic pulse generating means 11, a failure decision means 12, a failure warning means 13 and a reset signal input means 14. The main control means 10 has a substantially the same function as the main control means 73 in the conventional device shown in FIG. 7, and the reset signal input means 14 has a substantially the sane function as the reset means 75 in the conventional device. The diagnostic pulse generating means 11 has, in addition to the diagnostic pulse generating function in the diagnostic pulse generating means 74 of the conventional device, a function of stopping the generation of the diagnostic pulse during a monitor unit inspection time T3 for the purpose of inspecting the monitor unit according to the instruction from the failure decision means 12 at a first activation (referred to as starting hereinafter) of the arithmetic and control unit 1. The failure decision means 12 and the failure warning means 13 are newly added.

The monitor unit 3 is provided with a clock means 15, an overflow bit transfer means 16, an abnormality warning means 17 and a reset signal output means 18. The clock means 15 has a substantially the same function as the clock means 76 of the conventional device, the reset signal output means 18 has a substantially the same function as the reset signal output means 77 of the conventional device and the abnormality warning means 17 has a substantially the same function as the warning means 78. The overflow bit transfer means 16 is newly added.

The control unit 2 outputs a control signal for the antilock brake device, inspects whether the monitor unit 3 acts normally or not at the starting of the arithmetic and control unit 1, and gives a warning if it detects that it does not operate normally. When the normal operation of the monitor unit 3 is confirmed, the control unit 2 outputs a diagnostic pulse DCP at every normal execution of a unit control operation, the monitor unit 3 monitors the operating state of the control unit 2 by receiving the diagnostic pulse DCP, and notifies the control unit 2 of whether an abnormality occurred in the unit control operation in the form of a state value of the overflow bit. The control unit 2 counts the number of times in which the state value of the overflow bit informed by the monitor unit 3 has the state value corresponding to abnormality, and when it exceeds a prescribed allowable number of times N, it decides that the control unit itself is in a faulty state and warns about the failure.

Next, the functions of respective means will be described in detail. The main control means 10 has a function of receiving a wheel speed sensor signal SW of an antilock brake device to calculate the controlled value of brake fluid pressure based on a control program set in advance, and outputting a brake control signal CTL, as well as outputting a diagnostic pulse instruction signal IDP instructing issuance of a diagnostic pulse DCP to the diagnostic pulse generating means 11 at every normal execution of the unit control operation.

The diagnostic pulse generating means 11 is provided with a function of transmitting the diagnostic pulse DCP with cycle T1 to the monitor unit 3 by receiving the diagnostic pulse instruction signal IDP from the main control means 10. Moreover, the diagnostic pulse generating means 11 is provided with a function in which when it receives a monitor unit inspection instruction signal TWU at active level, it stops the generation of the diagnostic pulse DCP during the monitor unit inspection time T3 which is larger than a prescribed overflow decision time T2, and generates a second failure warning instruction signal IT2 if an internal reset signal RST2 is not received within the monitor unit inspection time T3.

The failure decision means 12 is provided with a function by which it receives an overflow bit signal OFB from the monitor unit 3 to detect the state value of the overflow bit, and after storing it in a first storage circuit, transmits an overflow bit clear signal OFC to the monitor unit 3. Moreover, when the overflow bit stored in a first storage circuit is not a prescribed state value ("1", for example) that corresponds to the overflow in the clock means 15, the failure decision means 12 decides that it is a starting of the arithmetic and control unit and outputs the monitor unit inspection instruction signal TWU in order to check whether or not the monitor unit 3 operates normally. Furthermore, the failure decision means 12 is provided with a function by which, when the overflow bit stored in the first circuit has the prescribed state value "1", it decides the state to be a reactivation and updates the number of times of overflow occurrence stored in a built-in nonvolatile memory by increasing it by 1, and outputs a first failure warning instruction signal IT1 if the updated number of times of overflow occurrence exceeds the prescribed allowable number of times.

The failure warning means 13 is provided with a function by which, after either one of the first failure warning instruction signal IT1 or the second failure warning instruction signal IT2 went to active level, it outputs continuously a failure warning signal TRBL to the outside.

The reset signal input means 14 is provided with a function by which it receives a pulse-form reset signal RST1 from the monitor unit 3 and shapes its waveform, and supplies the pulse-form internal reset signal RST2 at least to the main control means, the diagnostic pulse generating means 11 and the failure decision means 12.

The clock means 15 is provided with a function by which it counts the cycle time by receiving thee diagnostic pulse DCP, and when it decides that the cycle time is still larger than the overflow decision time T2 which is set larger than the cycle T1 of the diagnostic pulse DCP for the case the unit control is executed normally, it outputs as an overflow a state value signal OF with its overflow bit made to correspond to the prescribed state value "1".

The overflow bit transfer means 16 is provided with a function by which it receives the state value signal OF of the overflow bit from the clock means 15, temporarily stores it in a second storage circuit and after a lapse of a prescribed time Td outputs the overflow bit signal OFB with a signal level corresponding to the state value of the overflow bit, and when the overflow bit is the prescribed state value "1", it outputs an abnormality warning instruction signal IW, and outputs a reset instruction signal RSTO at active level during the prescribed time Td. Moreover, when it receives active level of the overflow bit clear signal OFC, in the overflow bit transfer means 16, the overflow bit which has been stored temporarily in the second storage circuit is cleared.

The abnormality warning means 17 is provided with a function which outputs an abnormality warning signal WRN to the outside by receiving active level of the abnormality warning instruction signal IW.

The reset signal output means 18 is provided with a function of transmitting the pulse-form reset signal RST1 to the control unit 2 based on the reset instruction signal RSTO.

Figure 2A:
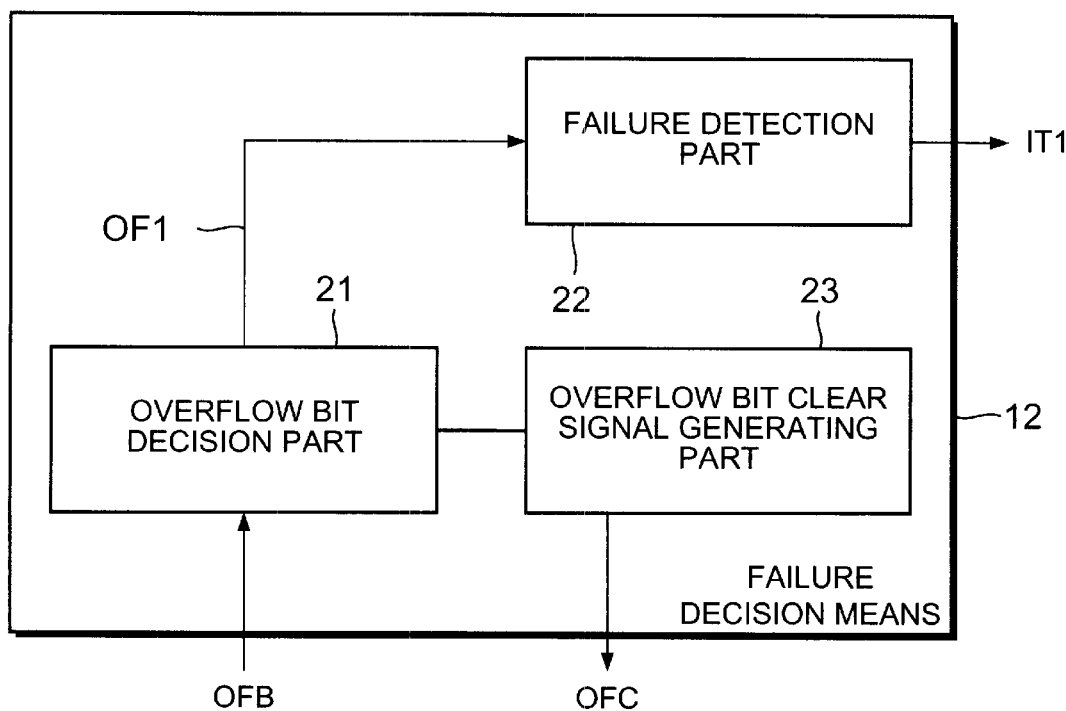
FIGS. 2A and 2B are detailed block diagrams of the failure decision means.
Figure 2B:
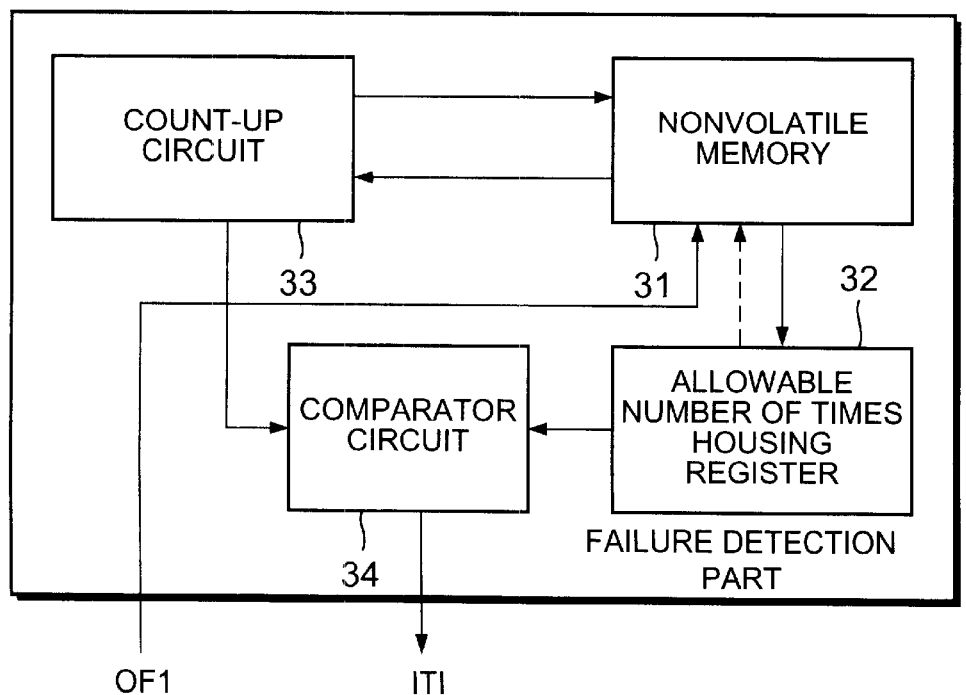

FIG. 2A is a detailed block diagram of the failure decision means 12, and FIG. 2B is a still more detailed block diagram of a failure detection part 22 in the failure decision means 12.

In FIG. 2A, the failure decision means 12 includes an overflow bit decision part 21, a failure detection part 22 and an overflow bit clear signal generating part 23. The overflow bit decision part 21 receives the overflow bit signal OFB to store the state value of the overflow bit in the built-in first storage circuit, and decides whether or not the overflow bit is the prescribed state value "1", and outputs an overflow decision signal OF1 as active level when it is the prescribed state value "1". The failure detection part 22 reads the number of times of overflow occurrence COF which has been stored in the built-in nonvolatile memory when the overflow decision signal OF1 went to active level, updates the number of times of overflow occurrence COF by adding one to it to write the updated number of times of overflow occurrence to the nonvolatile memory, and outputs the first failure warning instruction signal IT1 when the number of times COF of overflow occurrence exceeds the prescribed allowable number of times N. The overflow bit clear signal generating part 23 outputs the overflow bit clear signal OFC at active level to the overflow bit transfer means 16 upon receipt of the notification that the storage of the overflow bit at the overflow bit decision part 21 is completed.

As in FIG. 2B which shows a more detailed block diagram of the failure detection part 22, this part consists of a nonvolatile memory 31, an allowable number of times housing register 32, a count-up circuit 33 and a comparator circuit 34. The nonvolatile memory 31 stores the number of times COF of overflow occurrence and the allowable number of times N. When the overflow decision signal OF1 makes transition to active level, the allowable number of times housing register 32 reads and sets the allowable number of times N which has been stored in the nonvolatile memory 31. When the overflow bit decision signal OF1 makes transition to active level, the count-up circuit 33 reads the number of times COF of overflow occurrence which has been stored in the nonvolatile memory 31 and sets it on the counter, and after updating the counted value by increasing the counted value by 1, writes it to the nonvolatile memory 31 as the updated number of times COF of overflow occurrence. By storing the value in the nonvolatile memory 31 it is possible to reproduce the number of times COF of overflow occurrence prior to the reset even after the failure decision means 12 is reset due to the occurrence of the overflow. When a comparison between the updated counted value of the counter of the cont-up circuit 33, namely, the updated number of times COF of overflow occurrence and the allowable number of times N of the allowable number of times housing register 32 shows that the number of times COF of overflow occurrence is larger than the allowable number of times N, the comparator circuit 34 outputs the first failure warning instruction signal IT1.

Figure 3:
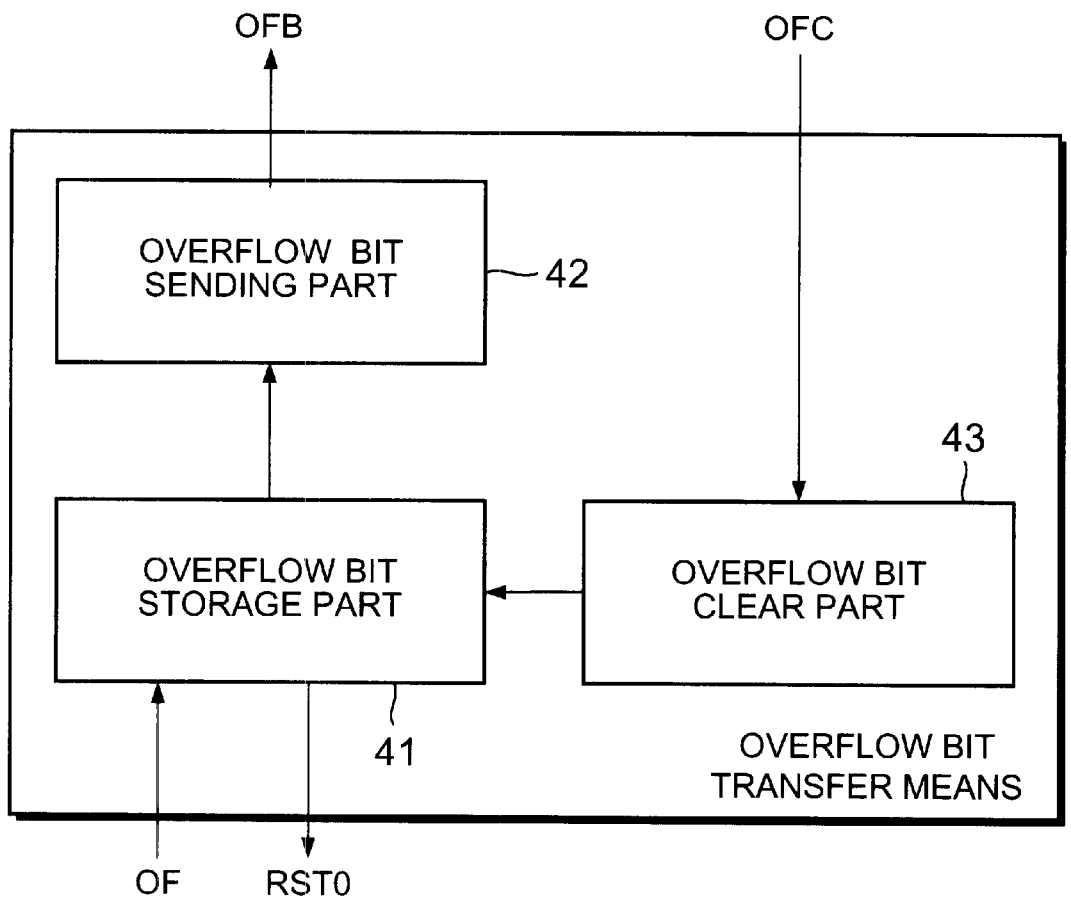
FIG. 3 is a detailed block diagram of the overflow bit transfer means.

FIG. 3 is a detailed block diagram of the overflow bit transfer means 16. The overflow bit transfer means 16 comprises an overflow bit storage part 41, an overflow bit sending part 42 and an overflow bit clear part 43. The overflow bit storage part 41 stores temporarily the state value of the overflow bit by receiving the state value signal OF sent from the clock means 15, and when the overflow bit is the prescribed state value that shows an overflow, outputs the reset instruction signal RSTO by sending it to active level and notifies the over flow bit sending part 42 of the state value of the overflow bit. Upon receipt of the notification about the state value of the overflow bit from the overflow storage part 41, and after a lapse of the prescribed time Td, the overflow bit sending part 42 outputs the overflow bit signal OFB by bringing it to the signal level that corresponds to the state value of the overflow bit. When the overflow bit clear signal OFC received from the control unit 2 made transition to active level, the overflow bit clear part 43 clears the overflow bit which has been stored in the overflow bit storage part 41.

Next, referring to an operating flow chart of the control unit 2 in FIG. 4 and the block diagram in FIG. 1, the operation of the arithmetic and control unit 1 will be described in detail.

First, at the starting of the arithmetic and control unit 1, the control unit 2 and the monitor unit 3 are reset. Accompanying the reset at the start, the overflow bit transfer part 41 in the overflow bit transfer means 16 is set to the state value "0" corresponding to the state in which no overflow has occurred. After this, 0 is written to the nonvolatile memory 31 in the failure decision means 12 as the number of times COF of overflow occurrence.

Figure 4:
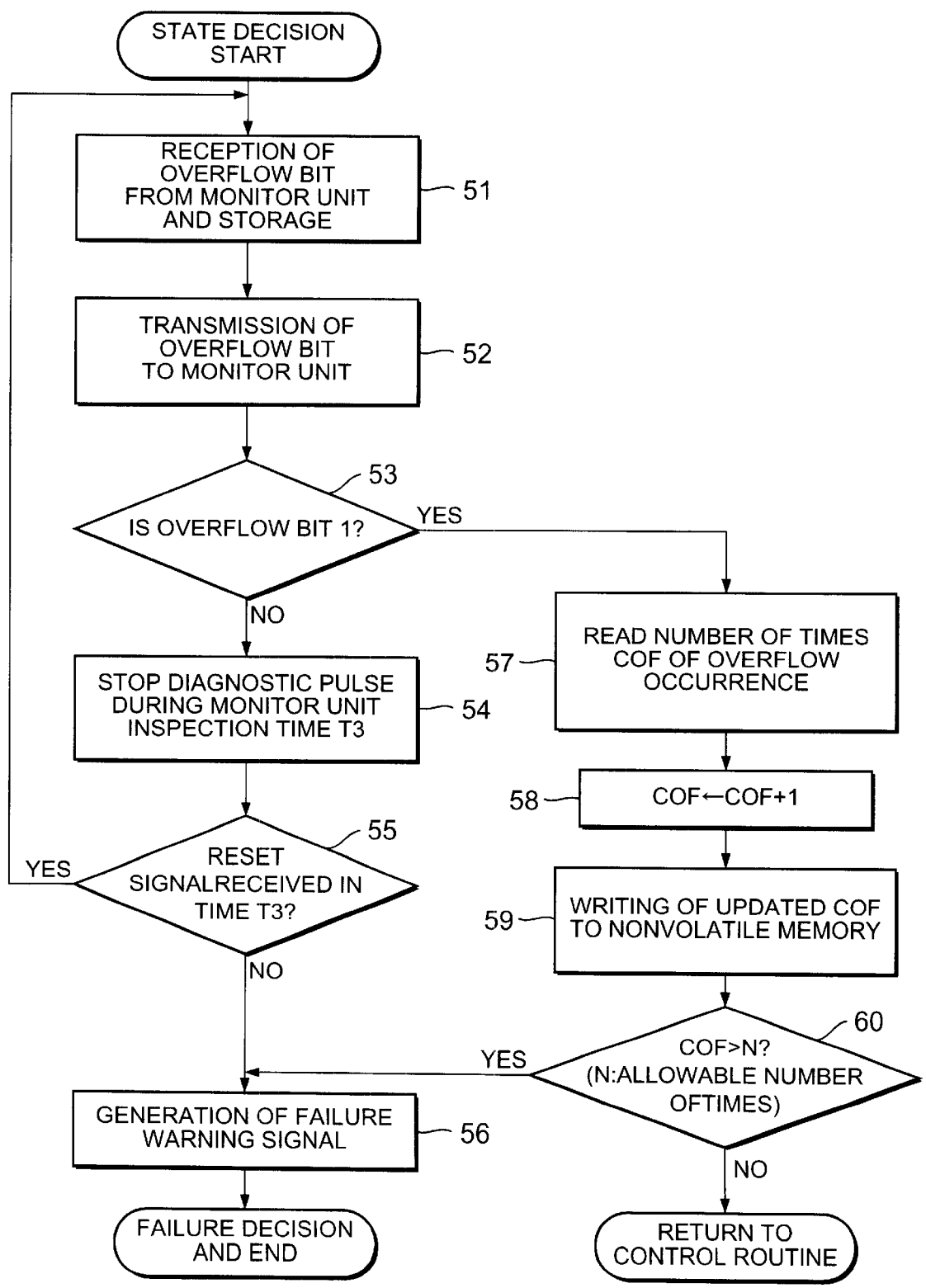
FIG. 4 is an operating flow chart of the control unit.

Next, proceeding to the operating flow in FIG. 4, in step 51, the control unit 2 stores the state value of the overflow bit transferred from the monitor unit 3 by the overflow bit signal OFB in the failure decision means 12. At the starting, the state value "0" is stored in the failure decision means 12 as the state value of the overflow bit.

Next, in step 52, the control unit 2 transmits the overflow bit clear signal OFC sent from the failure decision means 12 to the monitor unit 3. In the monitor unit 3, the state value of the overflow bit stored in the overflow bit transfer means 16 is cleared. Since the state value of the overflow bit stored in the overflow bit transfer means 16 at the start is "0", it remains at "0" also after the clearing.

Next, in step 53, the control unit 2 decides whether or not the state value of the overflow bit stored in the overflow decision means is "1". Since the state value of the overflow bit at the starting is "0", the control unit 2 recognizes it as a starting and proceeds to step 54.

In step 54, in the control unit 2, the failure decision means 12 outputs the monitor unit inspection instruction signal TWU to the diagnostic pulse generating means 11, and the generation of the diagnostic pulse DCP of the diagnostic pulse generating means 11 is stopped during the monitor unit inspection time T3 which is larger than the overflow decision time T2. When the monitor unit 3 is normal, if the clock means 15 does not receive the diagnostic pulse DCP within the overflow time T2, it is decided that an overflow occurred, and the overflow bit transfer means 16 stores the state value of the overflow as "1", and outputs the reset instruction signal RSTO as active level to the reset signal output means 18, and the reset signal output means 18 outputs the pulse-form reset signal RST1. In case, the clock means 15, the overflow bit transfer means 16 or the reset signal output means 18 of the monitor unit 3 is in failure, the reset signal RST1 will not be output.

Next, in step 55, the control unit 2 decides whether or not the reset signal RST1 is received within the monitor unit inspection time T3. If the monitor unit 3 is in failure, the control unit cannot receive the reset signal RST1 within the monitor unit inspection time T3, and the diagnostic pulse generating means 11 cannot be reset by the internal reset signal RST2 within the monitor unit inspection time T3, so that the control unit outputs a second failure warning instruction signal IT2 as active level.

If the reset signal RST1 has not been received within the monitor unit inspection time T3, it proceeds to step 56, and the failure warning means 13 of the control unit 2 outputs the failure warning signal TRBL as high level which is the active level upon receipt of the active level of the second failure warning instruction signal IT2.

Figure 5A:
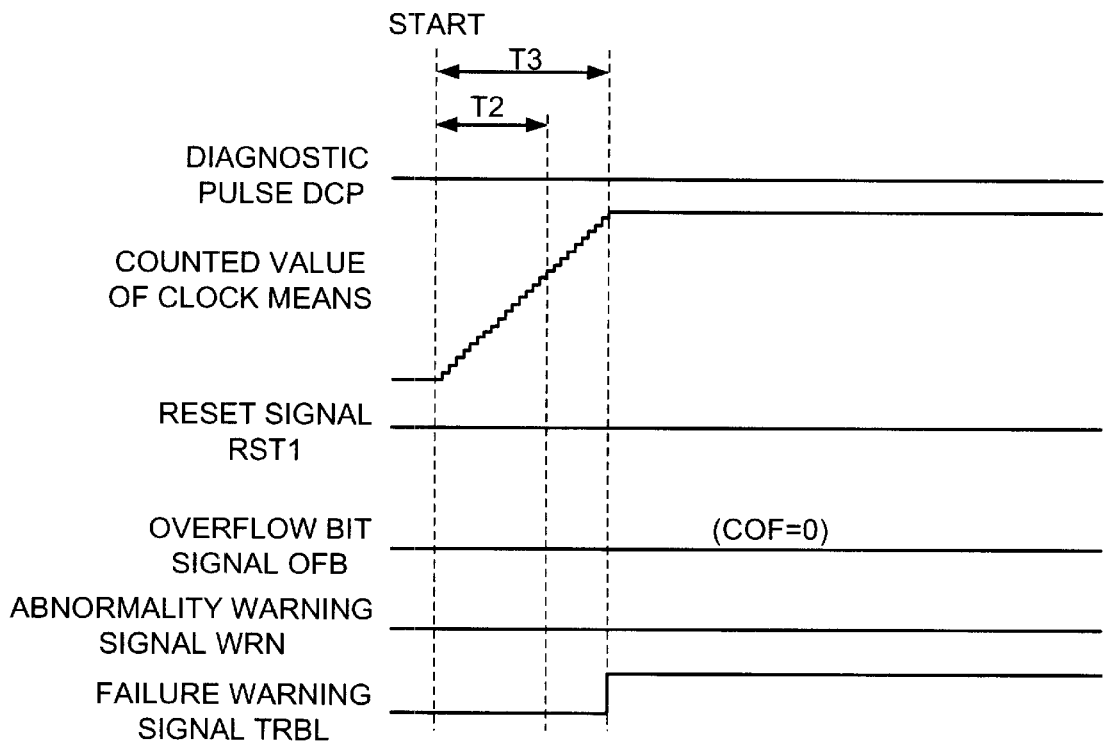
FIGS. 5A and 5B are operating timing chart when there is a failure in the monitor unit and an operating timing chart when the monitor unit is normal, respectively.

FIG. 5A is an operating timing chart when the monitor unit 3 is in failure. At the starting of the arithmetic and control unit 1, the control unit 2 stops the transmission of the diagnostic pulse DCP during the monitor unit inspection time T3, in step 54 in FIG. 4. The clock means 15 measures the time by counting the clock supplied to the entirety of the arithmetic and control unit 1, but because of the failure of the monitor unit 3 the monitor unit 3 does not output the reset signal RST1 even after the lapse of the overflow decision time T2, so that the control unit 2 outputs the failure warning signal TRBL after the lapse of the monitor unit inspection time T3. Since the overflow bit signal OFB does not make transition during this time to the high level corresponding to the state value "1", the number of times COF of overflow occurrence stored in the nonvolatile memory in the failure decision means 12 remains at 0.

In contrast, when the monitor unit 3 is operating normally, it is decided that the overflow occurred because the diagnostic pulse DCP has not been received within the overflow decision time T2, and the pulse-form reset signal RST1 is output from the overflow reset signal output means 18. In step 55, the reset signal input means 14 of the control unit 2 receives the reset signal RST1, the diagnostic pulse generating means 11 is reset within the monitor inspection time T3 by outputting the internal reset signal RST2, and returns to step 51. However, since this is an initial activation, the state value of the overflow bit is "0" at this time, and the number of times COF of overflow occurrence is 0. The monitor unit 3 outputs the reset signal RST1 as mentioned above, and temporarily stores the state value "1" of the overflow bit sent from the clock means 15 in the second overflow bit storage part 41 in the overflow transfer means 16, and after the lapse of the prescribed time Td outputs the overflow bit signal OFB as having overflow bit state value "1". Since the state value of the overflow bit is "1" at this time, the monitor unit 3 outputs an abnormality warning instruction signal IW.

Next, in step 51, the control unit 2 stores again the state value of the overflow bit transferred from the monitor unit 3 by the overflow bit signal OFB in the failure decision means 12, but this time the state value of the overflow bit stored in the failure decision means 12 is "1".

Next, proceeding to step 52, the control unit 2 transmits the overflow bit clear signal OFC to the monitor unit 3 from the failure decision means 12. In the monitor unit 3, the state value of the overflow bit which has been stored in the overflow bit transfer means 16 is cleared to become "0". Since, however, the state value "1" of the overflow bit generated in step 55 at the inspection of the monitor unit has already been sent to the failure decision means 12, it causes no inconvenience.

Next, in step 53, the control unit 2 decides whether or not the state value of the overflow bit is "1". Since the state value of the overflow bit stored in the failure decision means 12 is "1", it proceeds to step 57.

In step 57, the control unit 2 reads the number of times of COF of overflow occurrence which has been stored in the nonvolatile memory 31 in the failure decision means 12 to the count-up circuit 33 in the same failure decision means 12. Since the number of times COF of overflow occurrence stored in the nonvolatile memory 31 is 0, 0 is set in the count-up circuit 33. From the fact that the state value of the overflow bit stored in the failure decision means 12 is "1", and the number of times COF of the overflow occurrence read from the nonvolatile memory 31 is 0, the control unit 2 recognizes that the normal operation of the monitor unit 3 is confirmed and that the monitor unit itself is in the reactivated state.

Next, in step 58, the number of times of overflow occurrence is updated by adding 1 to the number of times COF of overflow occurrence of the count-up circuit 33. The number of times COF of overflow occurrence is changed to 1.

Next, in step 59, the updated number of times COF of overflow occurrence is written to the nonvolatile memory 31.

Next, in step 60, whether or not the number of times COF of overflow occurrence in the count-up circuit 33 is larger than the prescribed allowable number of times N (N is a positive integer not smaller than 1) is decided. Since COF=1, it is decided that it is not larger than the allowable number of times N, and the main control means 10 starts execution of the control program.

When the monitor unit 3 is decided to be normal at the starting of the arithmetic and control unit 1, it returns to the execution of the control program as described in the above, and thereafter the main control means 10 executes the unit control of the antilock brake control. In the control unit 2, the main control means 10 outputs the diagnostic pulse generation instruction signal IDP every time when the unit control is executed normally, and based on this the diagnostic pulse generating means 11 transmits the diagnostic pulse DCP of cycle T1. In the monitor unit 3, the clock means 15 measures the cycle time of the diagnostic pulse by receiving the diagnostic pulse and counting the clock, and when the cycle T1 of the diagnostic pulse is smaller than the overflow decision time T2, it is decided that the control unit 2 is operating normally, and waits for the next input of the diagnostic pulse DCP. As long as the unit control operation is executed normally, the operation in which the control unit outputs the diagnostic pulse DCP and the monitor unit 3 receives it, is repeated.

Figure 5B:
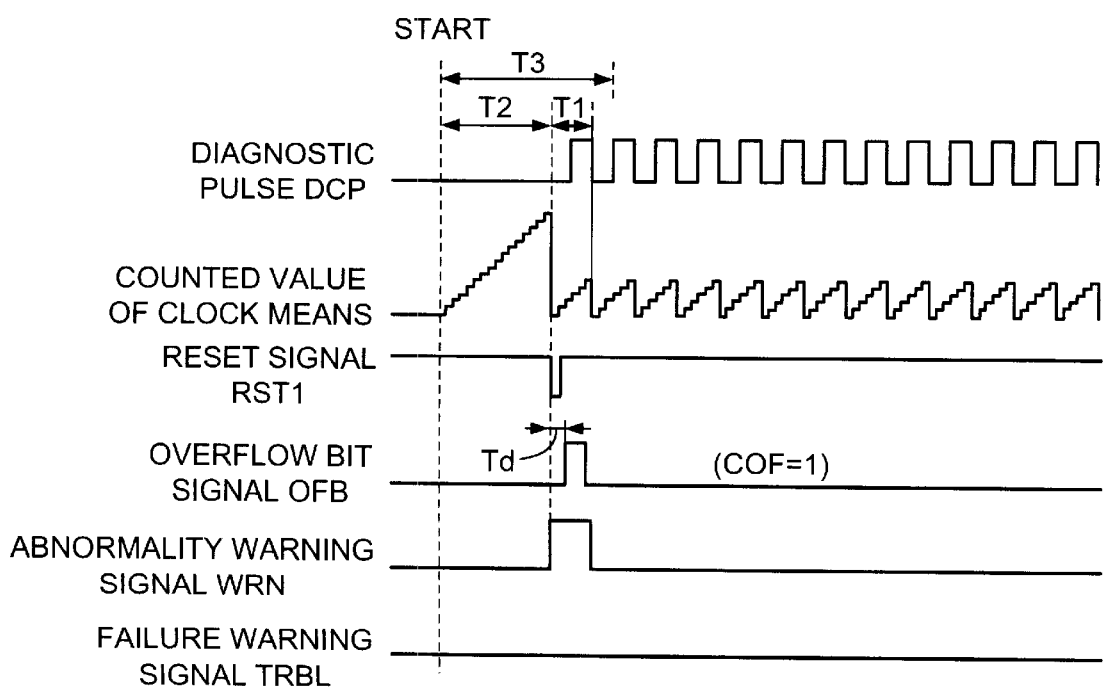

FIG. 5B is an operating timing chart at the starting of the unit 1 when the monitor unit 3 is normal. At the starting of the arithmetic and control unit 1, the control unit 2 stops the transmission of the diagnostic pulse DCP during the monitor unit inspection time T3 in step 54 of FIG. 4. The clock means 15 measures the time by counting the clock supplied to the entirety of the arithmetic and control unit 1, and decides it to be an overflow when it exceeds the overflow decision time T2, and the monitor unit 3 outputs the reset signal RST1. Moreover, at the lapse of the prescribed time Td after the output of the reset signal RST1, the monitor unit 3 outputs the overflow bit signal OFB as high level corresponding to the state value "1" of the overflow bit, and the signal OFB is received by the control unit 2. In step 53, the control unit 2 itself recognizes that the system has been reactivated by confirming the normalcy of the monitor unit 3 through the assignment of "1" to the state value of the overflow bit, and updates the number of times COF of overflow occurrence to 1. Thereafter, the control unit 2 continues to output the diagnostic pulse DCP of cycle T1 as long as the control operation of the main control means 10 is normal.

Next, referring to the operating flow chart in FIG. 4, the case in which an abnormality occurs in the diagnostic pulse DCP with irregular intervals due to some kind of failure in the main control means 10 of the control unit 2 which has so far been operating normally, will be described.

Since the control program is set so as to execute the diagnostic pulse issue instruction routine every time when the execution of the unit control of the main control means 10 is completed, if abnormality occurs in the control operation of the main control means 10, generation of the diagnostic pulse DCP from the control unit 2 is stopped, and the monitor unit 3 decides it to be an overflow and reactivates the control unit 2 by outputting the reset signal RST1 from the reset signal output means 18. In addition, after the lapse of the prescribed time Td the monitor unit 3 outputs the state of the overflow bit to the failure decision means 12 of the control unit 2 through the overflow bit transfer means 16. Following this, the control unit 2 executes the operation according to the flow of steps 51, 52, 53, 57, 58, 59 and 60.

Figure 6:
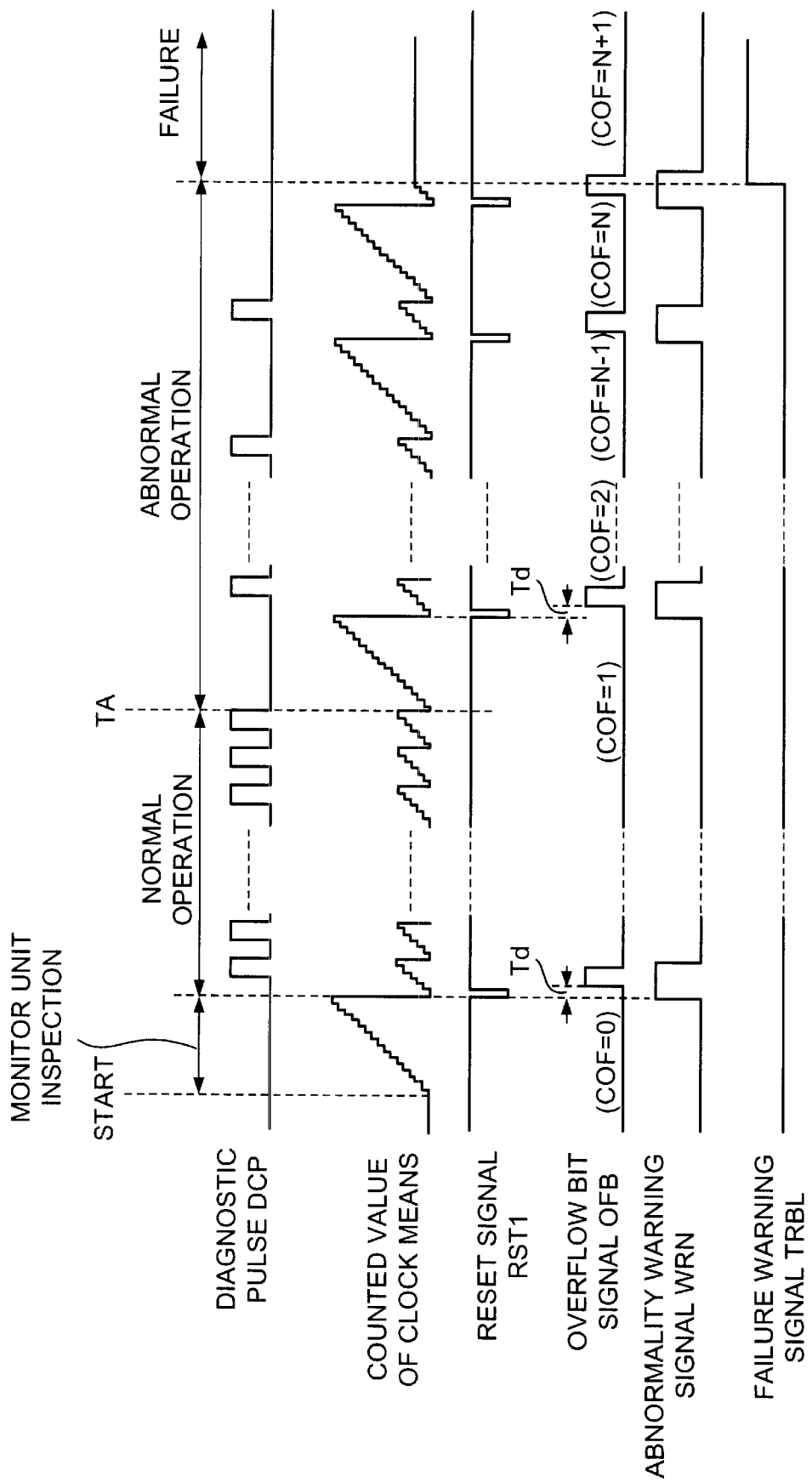
FIG. 6 is an operating timing chart when an abnormality in the control unit is repeated irregularly.

Assuming that abnormality occurred for the first time in the main control means 10 after continuous normal operation following an initial activation of the arithmetic and control unit 1, the operation of the arithmetic and control unit 1 will be described by referring to the operation after the time TA in the operating timing chart of FIG. 6. The operation prior to the time TA is the same as shown in FIG. 5B.

First, in step 51, the control unit 2 stores the fact that the state value of the overflow bit output from the monitor unit 3 is "1". Since the monitor unit 3 detected the overflow, the abnormality warning signal WRN as high level has already been output.

Next, in step 52, the control unit 2 outputs the overflow bit clear signal OFC to the monitor unit 3. By so doing, the state value of the overflow bit which has been stored in the overflow bit transfer means 16 of the monitor unit 3 is cleared.

Next, in step 53, the state value of the overflow bit is decided, and since it is "1", it proceeds to step 57 and reads the number of times COF of overflow occurrence from the nonvolatile memory 31 in the failure decision means 12. The number of times COF of overflow occurrence stored in the nonvolatile memory 31 is 1.

In step 58, 1 is added to the number of times COF of overflow occurrence to update it as COF=2, and the value is rewritten to the nonvolatile memory 31 in step 59. In step 60, whether or not the number of times COF of overflow occurrence exceeds the allowable number of times N is decided. If it does not exceed N, the diagnostic pulse DCP is generated from the diagnostic pulse generating means 11, the monitor unit 3 brings back the abnormality warning signal WRN to inactive low level upon detecting an edge of the diagnostic pulse DCP, and returns to the execution of the control program by the main control means 10.

Every time an abnormality occurs in the control operation of the main control means 10 of the control unit 2, the monitor unit 3 decides it as an overflow and reactivates the control unit 2 by outputting the reset signal RST1 from the reset signal output means 18. In addition, after the lapse of the prescribed time Td, the monitor unit 3 outputs the state of the overflow bit to the failure decision means 12 through the overflow bit transfer means 16. In response to this, the control unit 2 executes the series of operation from step 51 to step 60, increasing the number of times COF of overflow occurrence by 1 for every step.

If an abnormality occurs in the main control means 10 when the number of times COF of overflow occurrence stored in the nonvolatile memory 31 in the failure decision means 12 is equal to N, it becomes COF=(N+1) in step 58, and in step 60 the failure decision means 12 outputs the first failure warning signal IT1 by sending it to the active level because COF>N holds in the step.

Next, proceeding to step 56, the failure warning means 13 of the control unit 2 outputs continuously the failure warning signal TRBL as high level upon receipt of the active level of the first failure warning instruction signal IT1.

As described in the above, in this embodiment, whether the monitor unit 3 operates normally or not is inspected by detecting the arithmetic and control unit is at an initial activation, and by maintaining information about the state value of the overflow bit and the number of times of overflow occurrence at a reactivation through adjustment of the timings for control of detection and transfer of the state value of the overflow bit as well as storage of the number of times COF of overflow occurrence in the nonvolatile memory 31 in the failure decision means 12, it is made possible to detect that the number of times COF of overflow occurrence exceeded the prescribed number of allowed times N, so that this arithmetic and control unit 1 is endowed with both of the failure inspection function for the monitor unit 3 and the failure detection function for those failures in which the control unit 2 goes into irregular abnormal states. By setting the allowable number of times N to an appropriate value, abnormality in the control unit 2 due to accidental noise can be made to return quickly to the normal operation through reactivation analogous to the conventional unit, and when the occurrence frequency of abnormality is large, it is equally decided to be a failure in the control unit 2 regardless of the abnormality being continuous or intermittent or sporadic.

Moreover, when the arithmetic and control unit 1 according to this embodiment issued a failure warning, it is a state in which the number of times COF of overflow occurrence is 0 for a failure in the monitor unit, and it is a state in which the COF is (N+1) for a failure in the control unit. Since the number of times COF of overflow occurrence is stored in the nonvolatile memory 31 in the failure decision means 12, even in the case in which the power supply of the arithmetic and control unit 1 is cutoff once, the operation is stopped after failure warning and is started again, whether it was a failure in the monitor unit 3 or a failure in the control unit 2 can easily be decided by reading the number of times COF of overflow occurrence stored in the nonvolatile memory 31.

In FIG. 4, the reading of the number of times of overflow occurrence from the nonvolatile memory 31 in step 57 may be shifted to any stage of step 51 to step 53 if there is a margin in the processing time of step 51 to step 53, and the function of failure decision means may be changed so as to accommodate such a shift. Moreover, the allowable number of times N may be arranged such that fixed data recorded in a ROM are read to an allowable number of times housing register, or may be written once to the allowable number of times housings register 32 from the outside at the time of setting the allowable number of times, and write it to the nonvolatile memory so that it can be made changeable.

As described in the above, the arithmetic and control unit according to the present invention is provided with the monitor unit inspection function that inspects at an initial activation whether the monitor unit can carry out normal detection when an abnormality occurred in the monitor unit, as well as the failure decision function of the control unit that decides it to be a failure when the control unit generates abnormality more than prescribed number of times even when occurs with irregular intervals. As a result, the reliability of failure detection in antilock brake control can be enhanced markedly compared with the case in the conventional unit, and when a failure occurred, the determination of the failure location can also be facilitated.

Although the invention has been described with reference to a specific embodiment, this description is not meant to be construed in a limiting sense. Various modifications of the disclosed embodiment will become apparent to persons skilled in the art upon reference to the description of the invention. It is therefore contemplated that the appended claims will cover any modifications or embodiments as fall within the true scope of the invention.

What is claimed is:

1. An arithmetic and control unit comprising,
   a monitor unit which counts a cycle time by receiving diagnostic pulses and generates an overflow bit which takes on a prescribed state value when it is decided that the cycle time is larger than a prescribed overflow decision time and outputs the bit after a lapse of a prescribed time, and outputs a pulse-form reset signal at an active level during said prescribed time when the overflow bit is said prescribed state value, and
   a control unit which generates said diagnostic pulse at each execution of a unit control during control operation, is reactivated when receives the active level of said reset signal and, after an activation including a reactivation, receives and stores an overflow bit, and when the stored overflow bit is not said prescribed state value, it is decided to be an initial activation and stops the output of said diagnostic pulse to said monitor unit during a monitor unit inspection time which is larger than said overflow decision time, generates a failure warning signal if the reset signal is not received within said monitor unit inspection time, and when said stored overflow bit is said prescribed state value, it is decided to be a reactivation and outputs said failure warning signal as well when the updated number of times of overflow occurrence obtained by adding 1 (one) to the number of times of overflow occurrence which is stored in a nonvolatile memory exceeds a prescribed allowable number of times.

2. An arithmetic and control unit comprising,
   a monitor unit provided with a clock/transfer means which counts a cycle time by receiving diagnostic pulses and when the cycle time is decided to be larger than a prescribed overflow decision time, stores temporarily an overflow bit by giving a prescribed state value to it and after a lapse of a prescribed time outputs an overflow bit signal having a signal level corresponding to the state value of the temporarily stored overflow bit, and outputs a reset instruction signal at an active level during said prescribed time when said temporarily stored overflow bit is said prescribed state value, and clears said temporarily stored overflow bit when it receives an active level of an overflow bit clear signal, and a reset signal output means which outputs a pulse-form reset signal based on said reset instruction signal, and
   a control unit provided with a diagnostic pulse generation/failure decision means which outputs said diagnostic pulse to said monitor unit at every completion of normal execution of a unit control operation, receives said overflow bit signal and stores the state value of the overflow bit and outputs said overflow bit clear signal to said monitor unit, then if the stored overflow bit is not said prescribed state value, stops the output of said diagnostic pulse during a monitor unit inspection time which is larger than said overflow decision time by deciding the state to be an initial activation, and when an active level of an internal reset signal is not received within said monitor unit inspection time, outputs a failure warning instruction signal, and if the overflow bit is said prescribed state value, outputs said failure warning instruction signal when the number of times of overflow occurrence updated by increasing the number of times of overflow occurrence stored in a nonvolatile memory by 1 (one) exceeds a prescribed allowable number of times, a failure warning means which outputs a failure warning signal to the outside when said failure warning instruction signal goes to active level, and a reset signal input means which outputs said internal reset signal upon receipt of said reset signal from said monitor unit.

3. An arithmetic and control unit comprising, a monitor unit provided with a clock means which counts a cycle time by receiving diagnostic pulses and regards it as an overflow and imparts a prescribed state value to an overflow bit when it decides that the cycle time is larger than a prescribed overflow decision time, an overflow bit transfer means which stores temporarily the overflow bit received from said clock means and after a lapse of a prescribed time outputs the overflow bit as a signal level corresponding to the state value of the temporarily stored overflow bit and if said temporarily stored overflow bit is said prescribed state value, outputs a failure warning instruction signal and outputs a reset instruction signal as an active level, and clears said temporarily stored overflow bit when it receives active level of an overflow bit clear signal, an abnormality warning means which outputs an abnormality warning signal upon receipt of active level of said abnormality warning instruction signal, and a reset signal output means which outputs a pulse-form reset signal based on said reset instruction signal, and a control unit provided with a main control means which calculates a controlled value of a wheel based on signals from a wheel speed sensor of an antilock brake control device and outputs a control signal to the outside and instructs the output of a diagnostic pulse at every normal execution of a unit control operation, a failure decision means which receives the overflow bit signal from said monitor unit and stores the state value of the overflow bit and outputs said overflow bit clear signal to said monitor unit, then if the stored overflow bit is not the prescribed state value corresponding to the overflow, outputs a monitor unit inspection instruction signal by deciding that it is an initial activation, and if said stored overflow bit is said prescribed state value, decides that it is a reactivation and outputs a first failure warning instruction signal when the updated number of times of overflow occurrence obtained by increasing the number of times of overflow occurrence by 1 (one) exceeds a prescribed allowable number of times, a diagnostic pulse generating means which outputs a diagnostic pulse to said monitor unit upon receipt of a diagnostic pulse output instruction, and when receives active level of said monitor unit inspection instruction signal, stops the generation of the diagnostic pulse during a monitor unit inspection time which is larger than said overflow decision time and generates a second failure warning instruction signal if the internal reset signal is not received within said monitor unit inspection time, a failure warning means which outputs a failure warning signal continuously to the outside when either one of said first failure warning signal or said second failure warning signal went to active level, and a reset signal input means which receives said reset signal and supplies said reset signal to at least said main control means, said diagnostic pulse generating means, and said failure decision means.

4. The arithmetic and control unit as claimed in claim 3, wherein said failure decision means comprises, an overflow bit decision part which stores the state value of the overflow bit upon receipt of the overflow bit signal and decides whether or not overflow bit is the prescribed state value, and outputs an overflow decision signal as active level when it is said prescribed state value, an overflow bit clear signal generating part which outputs the overflow bit clear signal as active level by receiving a notification of completion of the overflow bit storage in said overflow bit decision part, and a failure detection part which reads the number of times of overflow occurrence stored in the nonvolatile memory when said overflow decision signal made a transition to active level, and write to said nonvolatile memory the updated number of times of overflow occurrence obtained by adding 1 (one) to the read value and outputs the first failure warning instruction signal when said updated number of times of overflow occurrence exceeds said prescribed allowable number of times.

5. The arithmetic and control unit as claimed in claim 4, wherein said failure detection part comprises, a nonvolatile memory which stores the number of times of overflow occurrence and the prescribed allowable number of times, a count-up circuit which reads and sets on a counter the number of times of overflow occurrence stored in said nonvolatile memory when said overflow decision signal made a transition to active level, updates the counted number by increasing the counted value by 1 (one), then writes the result to said nonvolatile memory as the updated number of overflow occurrence, an allowable number of times housing register which reads and sets the prescribed allowable number of times stored in said nonvolatile memory when said overflow decision signal made a transition to active level, and a comparator circuit which compares the updated counted value on the counter of said count-up circuit and the allowable number of times in said allowable number of times housing register and outputs the first failure warning instruction signal when the former is larger than the latter.

6. The arithmetic and control unit as claimed in claim 5, wherein said prescribed number of times is written to a prescribed address area of the nonvolatile memory from the outside via said allowable number of times housing register.

7. The arithmetic and control unit as claimed in claim 3, wherein said overflow bit transfer means comprises, an overflow bit storage part which stores temporarily the overflow bit received from the clock means and outputs the reset instruction signal as active level when the overflow has the prescribed state value which shows it to be an overflow, an overflow bit sending part which outputs the overflow bit signal at a signal level that corresponds to said state value of the overflow bit by receiving notification about the state value of overflow bit from said overflow bit storage part and after a lapse of a prescribed time, and an overflow bit clear part which clears the overflow bit stored in said overflow bit storage part when the overflow bit clear signal received from the control unit makes a transition to active level.

* * * * *